Patented Feb. 4, 1930

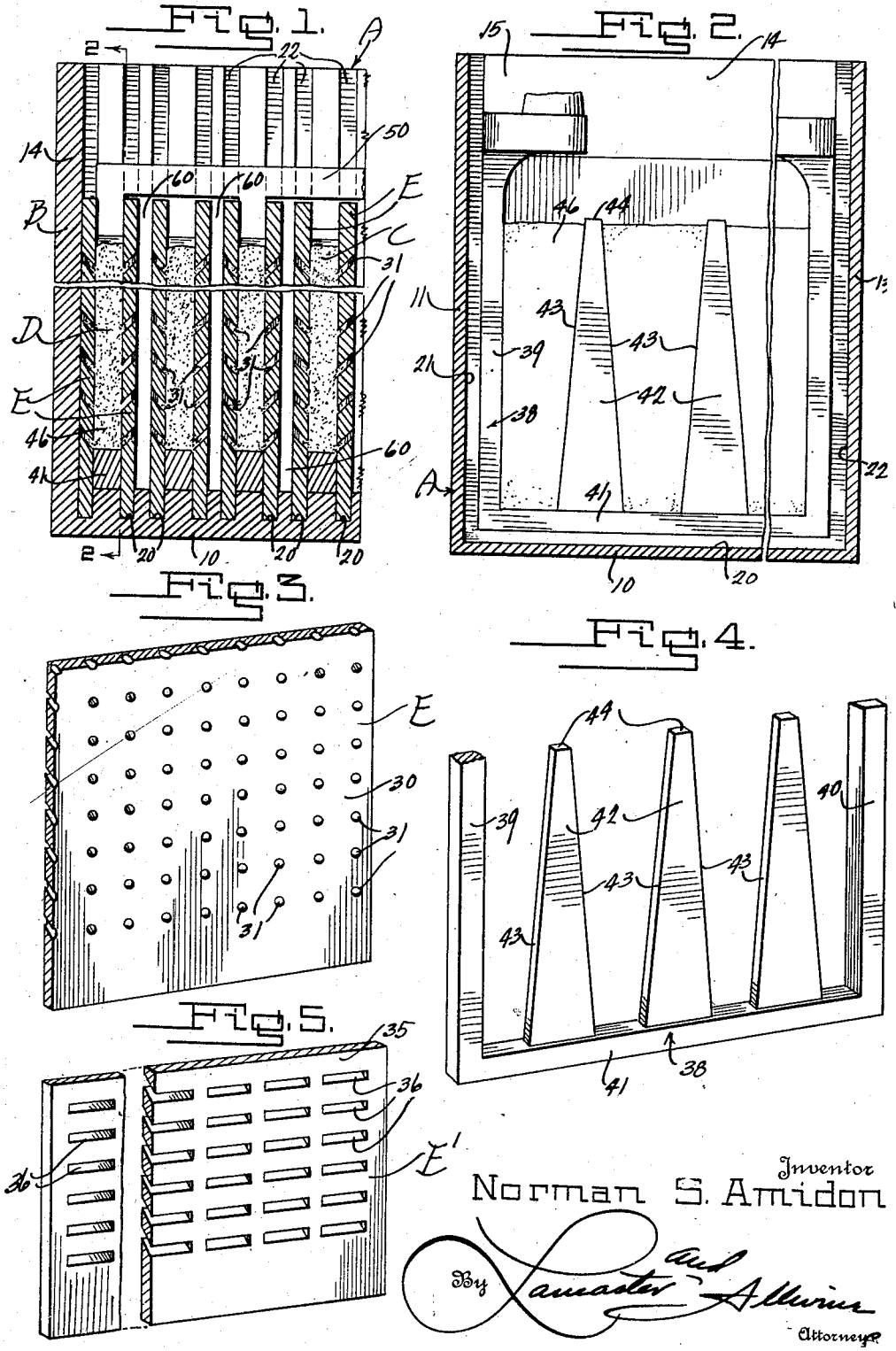

1,745,825

UNITED STATES PATENT OFFICE

NORMAN S. AMIDON, OF LAPEER, MICHIGAN

STORAGE BATTERY

Application filed June 14, 1926. Serial No. 115,932.

This invention relates to improvements in storage battery constructions.

The primary object of this invention is the provision of an improved storage battery construction, embodying novel means for separating and supporting the positive and negative plates in a battery container, which will eliminate buckling; short circuiting; and the collection of deposits or sediment in the container.

A further object of this invention is the provision of an improved storage battery embodying means to efficiently separate the positive and negative plates or grids in the battery, with a chamber or channel therebetween for receiving an electrolyte across which the chemical action may take place efficiently and without liability of short circuit.

A further object of this invention is the provision of novel means for supporting a novel separator within a battery container.

A further object of this invention is the provision of a novel battery plate of the grid type, embodying means to efficiently receive a grid material therein so that the same will be effectively packed and protected at all times.

Other objects and advantages of this invention will be apparent during the course of the following detailed description.

In the accompanying drawing, forming a part of this specification, and wherein similar reference characters designate corresponding parts throughout the several views, Figure 1 is a fragmentary sectional view taken through the improved storage battery, showing the assembled relation of the positive and negative plates and separators within the container or battery casing.

Figure 2 is a sectional view taken substantially on the line 2—2 of Figure 1.

Figure 3 is a fragmentary perspective view of a preferred type of battery plate separator of any approved insulating material.

Figure 4 is a fragmentary view of a grid frame which may be used in connection with the plate formation for the battery.

Figure 5 is a fragmentary perspective view of a modified form of separator which may be used in lieu of the separator illustrated in Figure 3.

In the drawing, wherein for the purpose of illustration is shown only a preferred embodiment of the invention, the letter A may generally designate the improved storage battery, which may consist of a casing or container B; positive plates C; negative plates D; and separators E for separating the positive and negative plates.

The battery container B is of course of any approved material, and in the preferred instance is preferably a moulded composition casing of an insulating material, such as hard rubber, or the same may be wood, fiber, or any other approved material. It includes a bottom 10; opposite side walls 11 and 13; and end walls 14. The compartment 15 in the container is of course open at the top of the container and in this open top a suitable cover of any approved material may be provided, according to conventional battery casing construction. The casing B is formed in a novel relation, in the provision of channels or guide grooves at the inner surfaces of the side walls 11 and 13 and inwardly of the inner surface of the bottom wall 10, for receiving the side marginal and bottom marginal portions of the separators E. To this end the bottom 10, and walls 11 and 13 are respectively provided with communicating grooves 20, 21 and 22 extending transversely thereacross; these grooves 20, 21 and 22 being provided in any approved spaced relation, but according to the preferred spaced relation illustrated in Figure 1 of the drawings, wherein the grooves 22 are spaced so that the separators may be properly accommodated therein for receiving the battery plates therebetween, and for providing bath chambers between the facing separators of adjacent positive and negative plates, which will be more subsequently described. Thus, for each separator E a U-shaped groove or slot is provided within the compartment of the casing construction in which the bottom and side marginal portions of each separator are received in a snug fitting and sealed relation against liability of formation of deposits past the connections of the marginal portions of the separators with the casing, between the plates, and this grooved arrangement about all marginal portions of the separator within the acid bath prevents buckling and wear upon the separators as occurs with conventional battery separators, in a manner well known to those skilled in the art.

Referring to the separator construction E, the separators E are of course flat and of rectangular or any other shape consistent with the shape in which the battery casing is formed. The preferred form of separator E preferably includes a body 30, which may be formed of any approved insulating material, such as wood, fiber, composition material, hard rubber and the like. It is provided with inclined circular apertures 31 transversely therethrough, which are inclined to the plane in which the body is formed, so that the apertures 31 have their upper ends opening at one side of the separator and their lower ends opening at the opposite side of the separator body. These openings 31 are unobstructed, and due to the inclined relation of the same, when they are in place between the battery plates, in the battery casing, the transverse formation of deposits is rendered difficult, and thus the short circuiting connections between the battery plates eliminated, which are a common source of trouble in conventional batteries in which the separator plates are apertured or become worn so as to permit the short circuiting connection between the plates.

Referring to the modified form of separator E', the body 35 thereof may be formed of any approved insulating material, and the difference in construction between the separators E and E' lies in the fact that the latter is provided with horizontally elongated slots 36, which are of rectangular formation in the plane of the body 35, and which are also inclined to the vertical, having their upper ends opening on one side of the separator and their lower ends opening at the opposite side of the separator body below the horizontal plane of communication of the upper ends on the separator. This inclined relation is illustrated in Figure 5 of the drawings. The horizontally elongated slots or openings 36 are preferably provided in series on the separator body 35, one above the other, and in length the openings 36 are sufficiently short to permit the accommodation of a plurality of said openings 36 horizontally across the separator body, as is illustrated in Figure 5 of the drawings; the slots or openings 36 thus not being sufficiently long to permit the vertical buckling or elongation of the battery separator, as would be the case if the slots were elongated from side to side of the separator.

The battery plates may be of any approved type, or of the special grid type illustrated in the drawings, consisting of the grid frame 38, which for each battery plate includes the vertical uprights 39 and 40, and the horizontal bottom connecting bar 41 which connects the lower ends of said uprights. In the plane formed by the frame bars or portions 39, 40 and 41, and vertically upstanding from the bar 41, and preferably formed integral therewith, are the tapered guide and reinforcing members 42, which at their base ends connect upon the bar 41 and are widest, and at the opposite side edge 43 thereof tapering upwardly in a divergent relation to the bluntly formed top edge 44, where the width of said members 42 is least. The members 42 are of uniform thickness, preferably of less thickness than the bar 41 or uprights of the frame 38, and in the spaces between the edges of the members 42, in the plane of the frame 38, is disposed the active material 46, which may be a plastic or pulverized active material, or any other approved material which will be caused to settle into a closely packed relation in the cavities between the side uprights and members 42 of the frame 38, due to the downward convergence of the side edges of adjacent members 42. It can readily be understood that separators E are placed in abutting relation with the opposite sides of the frame 38, so that the space bounded by the uprights and bottom bar 41 of the frame 38, is laterally closed by the opposed facing and abutting separators E, and the material 46 therefor will be caused to settle into a closely packed relation, due to the constricting of the pockets or spaces formed by the frame 38, from their upper ends downwardly. It is preferred that no top bar be provided for the frame 38, so that active material may be placed into the frame 38, between the adjacent separator plates, to compensate for dissipation of the same.

Both the positive and negative plates may be formed as above described, of the special grid construction, and it is to be understood that suitable buss bars or connecting pieces 50 may be provided, as illustrated in Figure 1, which connects all of the positive plates of the battery, and a similar arrangement provided for connecting all of the negative plates of the battery, in accordance with conventional battery construction.

Referring to the arrangement of the separators and plates in the battery, it is to be noted that each positive and negative plate are individually enclosed at opposite sides thereof by separators. The positive and negative plates are of course in alternating relation, and the separators E between adjacent positive and negative plates are spaced a short distance to provide acid bath compartments 60, wherein the electrolyte may be received to provide an efficient electrolytic action between the adjacent positive and negative plates thru the openings of the separators E or E', as the case may be. The chambers 60 in transverse dimension between the separators are preferably 1/16 of an inch, although this dimension may vary considerably, if desired.

The separators for each of the positive or negative plates are placed in a novel relation with respect to the plates. That is, each positive and negative plate is individually bounded by separators solely adapted for use with that plate, and the separators at opposite sides of the plates are placed so that the transverse openings or apertures thereof are inclined downwardly from the outer sides of the separators towards the plate therebetween, so that the lower ends of the openings of the separators face immediately the plate therebetween.

Other features of the battery not described and not shown are intended as conventional and the terminal post may be suitably connected in usual manner to the buss bars or other connections of the positive and negative plates.

From the foregoing description of the invention it is apparent that a novel battery has been provided, in which each positive and negative plate is separably guarded and protected by independent separator bodies solely adapted for the particular plate; the separators of different plates being in spaced relation to provide therebetween a shallow chamber for the reception of the electrolyte in order that an efficient action may be had thru the baffling apertures between the positive and negative plates, as can readily be understood by anyone skilled in the art to which this invention relates.

Various changes in the shape, size, and arrangement of parts may be made to the forms of invention herein shown and described, without departing from the spirit of the same or the scope of the claims.

I claim:

1. In a storage battery construction the combination of a casing having a compartment therein, positive and negative plates mounted in said casing compartment in spaced relation, individual separator members for each plate at opposite sides thereof, the separator members of adjacent plates being in spaced relation to provide a shallow chamber therebetween for receiving an electrolyte, said separator members having transverse apertures communicating between said chamber and their respective plates, said apertures being each inclined downwardly from the chambers with which they communicate to the plate onto which they communicate.

2. In a storage battery construction the combination of a container having a compartment therein, separators mounted in spaced relation within said container, and a battery plate in the space between said separators including a pocketed frame having upwardly extending guide uprights which are of greatest dimension at their base and gradually taper upwardly to a smaller dimension at the top thereof to provide pockets in the frame for receiving an active material which will be compact as it settles downwardly into the frame in said pockets between said adjacent uprights.

3. In a storage battery construction the combination of a container having a compartment therein, separators mounted in spaced relation within said container, and a battery plate in the space between said separators including a pocketed frame having a bottom bar and upwardly extending uprights rigid with the bottom bar extending upwardly into the space between said separators, said uprights being upwardly tapered with diminishing width, and said separators having transverse openings therein inclined to the horizontal and sloping from the outer sides of said separators towards the battery plate therebetween.

NORMAN S. AMIDON.